United States Patent Office 3,444,040
Patented May 13, 1969

3,444,040
PROCESS FOR PRODUCING PURINE
NUCLEOSIDE-5′-TRIPHOSPHATES
Takashi Nara, Tokyo, Masanaru Misawa, Kawasaki-shi, and Toshio Komuro, Machida-shi, Japan, assignors to Kyowa Hakko Kogyo Co., Ltd., Tokyo, Japan, a corporation of Japan
No Drawing. Filed Feb. 3, 1966, Ser. No. 524,827
Claims priority, application Japan, Feb. 11, 1965, 40/7,288
Int. Cl. C12b *1/00*
U.S. Cl. 195—28                     12 Claims

ABSTRACT OF THE DISCLOSURE

An improvement in the production of purine nucleoside-5′-triphosphates by the cultivation of microorganisms belonging to *Brevibaceterium ammoniagenes* which comprises conducting the fermentation in the presence of an organic carboxylic acid, such as citric acid, acetic acid, succinic acids, phthalic acid and the like, an organic solvent, such as an organic alcohol, ester, ketone, ether or aromatic hydrocarbon, a purine base, such as 8-azadenine,8-chloroxanthine, 2-thioadenine or 2-thio-6-hydroxypurine, or a surfactant, or mixtures thereof. The fermentation may be conducted under aerobic conditions with the addition of adenine or adenosine, or guanine or guanosine.

---

This invention relates to a process for producing purine nucleoside-5′-triphosphates. More particularly, it relates to a process for the production of purine nucleoside-5′-triphosphates by fermentation. Even more particularly, the invention relates to a process for the production of purine nucleoside-5′-triphosphates by fermentation with microorganisms in the presence of various organic acids, organic solvents, surfactants or derivatives of organic bases, particularly purine bases.

Purine nucleoside-5′-triphosphates are well known in the art. Specific examples thereof include adenosine 5′-triphosphate and guanosine 5′-triphosphate. Adenosine 5′-triphosphate (ATP) is a co-enzyme which is valuable in the transfer of phosphate bond energy, enabling an organism to deposit glucose as glycogen. Guanosine 5′-triphosphate, $C_{10}H_{16}N_5O_{14}P_3$, is likewise a known substance.

Previously, the present inventors found a process for producing purine nucleoside-5′-triphosphates in good yield by means of fermentation by cultivating a strain of microorganism belonging to *Brevibaceterium ammoniagenes* in the presence of a purine-type base or nucleoside, thereby producing the purine nucleotide-5′-triphosphate corresponding to said base (Japanese patent application No. Sho 38–57520 and Japanese patent application No. Sho 38–63229). However, it has been observed in this process that purine nucleoside diphosphate as well as purine nucleoside-monophosphate are produced and accumulated in addition to the purine nucleoside-5′-triphosphate. The present invention takes advantage of the fact that a purine nucleoside-5′-triphosphate may be biosynthesized from the corresponding monophosphate under certain conditions.

One of the objects of the present invention is to provide an improved process for the preparation of purine nucleoside-5′-triphosphates which overcomes the disadvantages and deficiencies of the prior art methods.

Another object of the present invention is to provide a process for producing purine nucleoside-5′-triphosphates by fermentation which may be carried out in an efficacious and simple manner.

A further object of the invention is to provide a process for preparing purine nucleoside-5′-triphosphates by fermentation which gives the product in high purity and good yield.

A still further object of the invention is to provide a process for producing purine nucleoside-5′-triphosphates by fermentation which may be carried out advantageously on a commercial industrial scale to give a high yield of product.

These and other objects and advantages of the present invention will become apparent to those skilled in the art from a consideration of the following specification and claims.

In accordance with the present invention, it has been found that an efficacious fermentation method for producing purine nucleoside-5′-triphosphates is effected by conducting a fermentation for the production thereof with a microorganism belonging to *Brevibacterium ammoniagenes* in the presence of various organic acids, organic solvents, surfactants or derivatives of organic bases. The addition of these latter substances to the culture liquor increases and promotes the production of said purine nucleoside-5′-triphosphates. The fact that certain chemical substances remarkably promote the production yield of said purine nucleoside-5′-triphosphate per se is definitely very advantageous from an industrial point of view as well as a very interesting biochemical phenomenon.

Organic acids which may be employed to produce the results accomplished by the present invention include, for example, citric acid, acetic acid, formic acid, succinic acid, fumaric acid, phthalic acid and the like. Effective organic solvents include, for example, xylene, toluene, benzene, methanol, ethanol, ethyl acetate, etc. Examples of surfactants which may be utilized include Cation AB,[1] Cation $F_250$, Naimin S–215, Kotamin D24,[2] cetylpyridinium chloride, cetylpyridinium bromide, cetyltrimethylammonium bromide, Emal A, Softer No. 601, Nonion E215,[3] Nonion NS208 and Nonion O2. Derivatives of organic bases which may be employed include derivatives of purine such as 8-aza-adenine, 8-chloroxanthine, 2-thioadenine and 2-thio-6-hydroxypurine. Mixtures of these substances may also be employed.

Although a definite statement cannot be made in view of the particular type of material added and the particular conditions of fermentation as to when and in what concentration the additives of the present invention should be employed, but the greatest effect can often be achieved when such materials are added after the growth of the strain has reached a stationary state.

The purine nucleoside-5′-triphosphate produced when adenine or adenosine is added to the fermentation medium is the adenosine 5′-triphosphate corresponding thereto. When guanine or guanosine is added to the medium, the corresponding guanosine 5′-triphosphate is produced.

As stated above, the microorganism found to be effective in the process of the present invention is that belonging to *Brevibacterium ammoniagenes*.

The following examples are given merely as illustrative of the present invention and are not to be considered as limiting. The percentage of each component in the fermentation medium is given by weight relative to the total volume of its solution in water. The yield of accumulated product is expressed in mg./ml. of the disodium salt of 5′-guanylic acid for 5′-guanylic acid and in mg./ml. of the non-sodium anhydrous product for the other 5′-nucleotides.

---

[1] Trimethyloctadecylammonium chloride.
[2] Tertiaryammonium salt (more definite chemical description has not been available).
[3] Polyoxyethylene oleinether.

EXAMPLE 1

*Brevibacterium ammoniagenes* ATCC 6872 is used as the seed bacterium. It is cultivated for 24 hours in a seed medium consisting of 2% glucose, 1.5% peptone, 0.2% urea, 0.1% $K_2HPO_4$, 0.03% $MgSO_4 \cdot 7H_2O$, 0.3% NaCl, 0.01% $FeSO_4 \cdot 7H_2O$ and 30 γ/l. biotin, the seed medium having a pH of 7.3, before it is inoculated into the fermentation medium.

The fermentation medium employed has the following composition: 10% glucose, 1% $K_2HPO_4$, 1% $KH_2PO_4$, 0.1% $MgSO_4 \cdot 7H_2O$, 0.01% $CaCl_2 \cdot 2H_2O$, 30 γ/l. biotin, 5 γ/ml. calcium pantothenate, 3 γ/ml. thiamine hydrochloride, 0.2% meat extract.

The pH of the fermentation medium is adjusted to 8.0 with 5 N NaOH. After sterilization thereof under pressure, the urea, which was sterilized separately, is added in an amount of 0.6% to the fermentation medium.

The seed culture is inoculated into the fermentation medium in an amount of 10% by volume. Twenty ml. portions of the combination of seed medium and fermentation medium are poured into 250 ml. conical flasks. Culturing is then carried out with shaking at 30° C.

Guanine is added to the culture 72 hours after the start thereof in an amount to give a concentration of 3 mg./ml. therein. At the same time, the various components shown in Table 1 below are added to various flasks. After culturing for another 24 hours, guanine-5′-nucleotides are accumulated in the fermentation liquor, depending on the particular additive employed, as shown in Table 1.

TABLE 1

| Additive | Concentration of additive (percent) | Quantity of accumulation (mg./ml.) | | |
|---|---|---|---|---|
| | | Sodium salt of 5′-guanylic acid | Guanosine-5′-diphosphate | Guanosine-5′-triphosphate |
| No additive | | 2.10 | 2.00 | 2.26 |
| Organic acids: | | | | |
| Sodium fumarate | 0.5 | 0.95 | 1.48 | 6.24 |
| Sodium formate | 1.0 | 0.69 | 2.05 | 6.40 |
| Sodium citrate | 0.5 | 1.10 | 1.05 | 5.54 |
| Sodium acetate | 1.0 | 1.50 | 1.80 | 5.40 |
| Sodium succinate | 2.0 | 1.40 | 1.00 | 5.40 |
| Phthalic acid | 0.5 | 1.32 | 1.17 | 5.24 |
| Organic solvents: | | | | |
| Xylene | 1.0 | 0.82 | 1.03 | 7.52 |
| Toluene | 1.0 | 0.98 | 0.91 | 6.92 |
| Benzene | 2.0 | 0.61 | 1.03 | 6.72 |
| Methanol | 1.0 | 1.76 | 1.47 | 4.30 |
| Ethanol | 1.0 | 1.00 | 1.21 | 4.90 |
| Ethyl acetate | 2.0 | 1.08 | 0.84 | 5.22 |

EXAMPLE 2

A culture is carried out with the same seed bacterium and fermentation medium as described in Example 1. However, various surfactants and derivatives of purine bases are added to the culture, instead of the organic acids and organic solvents of Example 1, at the same time as when guanine is added to the culture in an amount to give a concentration of 3 mg./ml. thereof, i.e., 72 hours after the start of the culture. The culture is then continued for another 24 hours, and guanine-5′-nucleotides are accumulated, depending upon the particular additive employed, as shown in Table 2.

TABLE 2

| Additive | Concentration of additive (percent) | Quantity of accumulation (mg./ml.) | | |
|---|---|---|---|---|
| | | Sodium salt of 5′-guanylic acid | Guanosine-5′-diphosphate | Guanosine-5′-triphosphate |
| No additive | | 2.10 | 2.00 | 2.26 |
| Surfactants: | | | | |
| Cation F₂50 [1] | 0.1 | 0.91 | 0.97 | 5.95 |
| Cetylpyridinium chloride | 0.1 | 1.19 | 1.00 | 5.85 |
| Softer No. 601 [2] | 0.5 | 1.20 | 1.34 | 4.98 |
| Nonion NS 208 [3] | 1.0 | trace | 1.98 | 4.60 |
| Nonion 02 [4] | 1.0 | 0.86 | 1.89 | 4.02 |
| Derivatives of purine bases: | | | | |
| 2-thioadenine | 0.05 | 0.65 | 1.98 | 5.30 |
| 2-thio-6-hydroxy-purine | 0.1 | 1.38 | 1.80 | 4.62 |
| 8-aza-adenine | 0.1 | 1.72 | 1.20 | 4.20 |
| 8-chloroxanthine | 0.1 | 1.34 | 1.42 | 3.81 |

[1] Alkyl dimethylbenzyl ammonium chloride, supplied by Nissan Oil and Fat Chemical Co.
[2] Alkyl betaine, supplied by Nissan Oil and Fat Chemical Co.
[3] Polyoxyethylene alkyl allyl ether, supplied by Nissan Oil and Fat Chemical Co.
[4] Polyethylene glycol monooleate, supplied by Nissan Oil and Fat Chemical Co.

EXAMPLE 3

The same seed bacterium and fermentation medium as described in Example 1 are employed. Culturing is also carried out in the same way as Example 1 except that adenine, rather than guanine, is added to the culture medium. The adenine is added 72 hours after the start of the culturing in a quantity sufficient to give a concentration of 3 mg./ml. therein. The various additives shown in Table 3 are added at the same time to various flasks. The resultant accumulation of adenine-5′-nucleotide is shown in Table 3.

TABLE 3

| Additive | Concentration of additive (percent) | Quantity of accumulation (mg./ml.) | | |
|---|---|---|---|---|
| | | 5′-adenylic acid | Adenosine 5′-diphosphate | Adenosine 5′-triphosphate |
| No additive | | 2.15 | 2.25 | 2.40 |
| Organic acids: | | | | |
| Sodium citrate | 0.5 | 0.55 | 0.90 | 6.25 |
| Sodium fumarate | 0.5 | 0.40 | 1.45 | 5.80 |
| Sodium formate | 1.0 | 0.80 | 1.45 | 5.25 |
| Sodium succinate | 0.5 | 1.00 | 1.60 | 5.25 |
| Sodium acetate | 1.0 | 0.95 | 2.00 | 4.75 |
| Organic solvents: | | | | |
| Xylene | 0.5 | trace | 1.05 | 6.84 |
| Toluene | 1.0 | trace | 1.20 | 6.35 |
| Benzene | 1.0 | 0.70 | 1.35 | 6.00 |
| Methanol | 1.0 | 0.88 | 1.75 | 5.35 |
| Surfactants: | | | | |
| Cation $F_250$ | 0.1 | 1.25 | 1.40 | 5.75 |
| Emal A* | 0.1 | 1.40 | 1.70 | 5.50 |
| Cetyltrimethyl ammonium bromide | 0.1 | 1.45 | 2.00 | 4.90 |
| Derivative of purine base: 2-thioadenine | 0.05 | 1.55 | 1.00 | 6.00 |

*Higher alcohol sulfate, supplied by Kao Soap Co. (More definite chemical description has not been available.)

EXAMPLE 4

*Brevibacterium ammoniagenes* ATCC 6871 is used as the seed bacterium, and the same seed medium as that described in Example 1 is employed therefor.

The fermentation medium utilized consists of: 10% glucose, 1.2% $K_2HPO_4$, 1.2% $KH_2PO_4$, 1.2% $MgSO_4 \cdot 7H_2O$, 0.01% $CaCl_2 \cdot 2H_2O$, 30 γ/l. biotin, 2 γ/ml. β-alanine, 0.5 γ/ml. thiamine hydrochloride, 0.5% peptone.

The pH of the fermentation medium is adjusted to 8.0 before sterilization thereof. After sterilization under pressure, urea in an amount of 0.6%, which was separately sterilized, is added to the fermentation medium. Culturing is carried out under the same conditions and in the same manner as described in Example 1.

After 48 hours of culturing, guanine is added to the culture liquid in an amount to give a concentration of 3 mg./ml. therein. Atfer 12 more hours of culturing, xylene and toluene are added to various flasks in the concentrations shown in Table 4. The quantities of guanine-5′-nucleotides accumulated in the fermentation liquor after 92 hours of culturing are shown in Table 4.

TABLE 4

| Additive | Concentration of additive (percent) | Quantity of accumulation (mg./ml.) | | |
|---|---|---|---|---|
| | | Sodium salt of 5′-guanylic acid | Guanosine-5′-diphosphate | Guanosine-5′-triphosphate |
| No additive | | 1.85 | 2.00 | 2.11 |
| Xylene | 0.1 | 1.39 | 1.50 | 3.60 |
| | 0.25 | 0.78 | 1.35 | 5.70 |
| | 0.5 | 0.55 | 1.40 | 6.00 |
| | 1.0 | 0.80 | 1.40 | 5.85 |
| | 1.50 | 1.35 | 1.20 | 3.80 |
| Toluene | 0.1 | 1.45 | 1.95 | 2.85 |
| | 0.25 | 1.00 | 1.45 | 4.50 |
| | 0.5 | 0.70 | 1.35 | 6.05 |
| | 1.0 | 0.80 | 1.45 | 5.89 |
| | 1.5 | 1.10 | 1.65 | 2.85 |

EXAMPLE 5

The same seed bacterium as that employed in the Example 4 is cultivated in a seed medium consisting of 2% glucose, 3% meat extract, 0.1% urea, 0.1% $K_2HPO_4$, 0.03% $MgSO_4 \cdot 7H_2O$ and 30 γ/l. biotin for 24 hours. Then, 10% by volume of the cultivated product is transferred to the fermentation medium of Example 4 after an amount of adenine so as to give a concentration of 3 mg./ml. therein is added thereto. Culturing is then carried out as described in Example 4.

After the start of the culturing, the organic solvents, methyl ethyl ketone and dioxane, are added to the fermentation liquor in various flasks at different times and in different quantities. These variations are shown in Table 5. After culturing has continued for 96 hours, amounts of adenine-5′-nucleotides are accumulated in the fermentation liquid as shown in Table 5.

TABLE 5

| Additive | Time of additon (No. of hours after start of culturing) | Quantity of additive (percent) | Quantity of accumulation (mg./ml.) | | |
|---|---|---|---|---|---|
| | | | 5′-adenylic acid | Adenosine-5′-diphosphate | Adenosine-5′-triphosphate |
| No additive | | | 2.04 | 2.15 | 2.00 |
| Methyl ethyl ketone | 24 | 1 | 1.95 | 2.13 | 4.04 |
| | | 0.5 | 1.45 | 1.80 | 5.60 |
| | | 0.1 | 0.85 | 1.10 | 6.05 |
| | 48 | 1 | 1.78 | 2.20 | 4.22 |
| | | 0.5 | 1.30 | 1.75 | 5.80 |
| | | 0.1 | 0.75 | 0.75 | 6.30 |
| | 72 | 1 | 1.43 | 1.98 | 4.76 |
| | | 0.5 | 0.45 | 1.85 | 6.05 |
| | | 0.1 | 0.35 | 1.25 | 6.25 |
| Dioxane | 24 | 2 | 1.99 | 2.21 | 4.00 |
| | | 1 | 1.45 | 1.85 | 4.40 |
| | | 0.2 | 1.33 | 1.80 | 4.85 |
| | 48 | 2 | 1.00 | 2.00 | 4.96 |
| | | 1 | 1.21 | 1.95 | 5.25 |
| | | 0.2 | 1.00 | 1.54 | 4.15 |
| | 72 | 2 | 0.85 | 1.95 | 5.11 |
| | | 1 | 0.50 | 1.45 | 6.00 |
| | | 0.2 | 2.00 | 1.80 | 2.45 |

EXAMPLE 6

*Brevibacterium ammoniagenes* KY3464 ATCC 15750 is used as the seed bacterium and the same seed medium and fermentation medium as those of Example 1 are employed. The conditions of culturing are also the same. Guanine is added after 72 hours of culturing in an amount so as to give a concentration of 3 mg./ml. therein. At the same time, a further additive, as shown in Example 6, is added to various flasks. After culturing is continued for another 24 hours, guanosine 5′-triphosphate is found to be accumulated in the amounts shown in Table 6.

TABLE 6

| Additive | Quantity of additive (percent) | Guanosine 5'-triphosphate (mg./ml.) |
| --- | --- | --- |
| No additive | | 1.85 |
| Sodium formate | 1.0 | 5.20 |
| Sodium citrate | 0.5 | 5.20 |
| Sodium tartrate | 2.0 | 4.80 |
| Sodium fumarate | 0.5 | 4.75 |
| Xylene | 0.5 | 5.85 |
| Isopropanol | 1.0 | 3.64 |

EXAMPLE 7

Brevibacterium ammoniagenes KY 3465 ATCC 15751 is used as the seed bacterium and cultivated in the same manner as described in Example 4, except that 3 mg./ml. of adenine is added at the beginning of culturing. After 48 hours of culturing, an organic solvent and a surfactant were added to various flasks as shown in Table 7. The quantity of the adenosine 5'-triphosphate accumulated in the fermentation liquor for the various additions is shown in Table 7.

TABLE 7

| Additive | Quantity of additive (percent) | Adenosine 5'-triphosphate (mg./ml.) |
| --- | --- | --- |
| No additive | | 2.05 |
| Xylene | 0.5 | 6.00 |
| Benzene | 0.5 | 5.75 |
| Isopropanol | 1.0 | 4.20 |
| Isoamyl alcohol | 1.0 | 4.15 |
| Kerosine No. 1 [1] | 1.0 | 4.11 |
| Emal A | 0.05 | 5.25 |
| Naimin S215 [2] | 0.05 | 4.50 |

[1] No. 1 means lot number of the kerosine used. Its chemical composition has not been available.
[2] Polyoxyethylene alkylamine, supplied by Nissan Oil and Fat Chemical Co.

It can be seen from the above disclosure and examples that quite a wide range of substances may be employed in the process of the present invention. Organic carboxylic acids which may be utilized include both saturated and unsaturated aliphatic acids as well as aromatic acids such as the phthalic acids. The organic solvents which may be employed include aromatic hydrocarbons as well as organic alcohols, esters, ketones, and ethers. As can be seen from the above, the surfactants include the cationic, anionic and nonionic types. Finally, it can be seen that the preferred organic base derivatives are derivatives of purine bases.

The conditions of culturing and the fermentation media to be employed are those used conventionally and suitably in the art for the cultivation of Brevibacterium ammoniagenes. Either a synthetic medium or a natural nutrient medium is suitable as long as it contains the essential nutrients for the growth of the microorganisms employed. Such nutrients are well known in the art and include substances such as a carbon source, a nitrogen source, inorganic compounds and the like which are utilized by the bacterium employed in appropriate amounts. Thus, as carbon source, there may be mentioned, by way of example, carbohydrates such as glucose, starch hydrolysates, molasses, etc., or any other conventional carbon source. These substances may be used either singly or in mixtures of two or more. As a nitrogen source, various kinds of inorganic or organic salts or compounds, such as urea or ammonium salts such as ammonium chloride, ammonium nitrate, etc., or natural substances containing nitrogen, such as cornsteep liquor, yeast extract, meat extract, peptone, fish meal, etc., may be employed. Again these substances are utilizable either singly or in combinations of two or more. Inorganic compounds which may be added to the culture medium include potassium phosphate, magnesium sulfate, potassium chloride, etc. The fermentation is conducted under aerobic conditions, such as aerobic shaking of the culture or with stirring of a submerged culture at a temperature of about 20° to 40° C. and a pH of about 5.5 to 9.0.

The invention being thus described, it will be obvious that the same may be varied in many ways. Such variations are not to be regarded as a departure from the spirit and scope of the invention and all such modifications are intended to be included within the scope of the following claims.

What we claim is:

1. In a fermentation process for the production of purine nucleoside-5'-triphosphates by the cultivation of the microorganism Brevibacterium ammoniagenes, the improvement which comprises conducting the fermentation in the presence of at least one member selected from the group consisting of citric acid, acetic acid, formic acid, succinic acid, fumaric acid, phthalic acid, tartaric acid and sodium salts of said acids, xylene, toluene, benzene, methanol, ethanol, ethyl acetate, methyl ethyl ketone, dioxane, isopropanol, isoamyl alcohol, 8-chloroxanthine, 2-thioadenine and 2-thio-6-hydroxypurine.

2. A process for producing purine nucleoside-5'-triphosphates which comprises culturing the microorganism Brevibacterium ammoniagenes in an aqueous nutrient medium under aerobic conditions in the presence of at least one member selected from the group consisting of citric acid, acetic acid, formic acid, succinic acid, fumaric acid, phthalic acid, tartaric acid and sodium salts of said acids, xylene, toluene, benzene, methanol, ethanol, ethyl acetate, methyl ethyl ketone, dioxane, isopropanol, isoamyl alcohol, 8-chloroxanthine, 2-thioadenine and 2-thio-6-hydroxypurine, and accumulating the purine nucleoside-5'-triphosphates in the resultant culture liquor.

3. The process of claim 2, wherein culturing is carried out at a temperature of about 20° to 40° C. and at a pH of about 5.5 to 9.0.

4. The process of claim 2, wherein said purine nucleoside-5'-triphosphates are selected from the group consisting of adenosine 5'-triphosphate and guanosine 5'-triphosphate.

5. The process of claim 2, wherein said member is added to the fermentation medium after the growth of the microorganism has reached a stationary state.

6. The process of claim 2, wherein said microorganism is selected from the group consisting of Brevibacterium ammoniagenes ATCC 6871 and Brevibacterium ammoniagenes ATCC 6872.

7. A process for producing adenosine 5'-triphosphate which comprises culturing the microorganism Brevibacterium ammoniagenes in an aqueous nutrient medium containing a source of carbon and nitrogen under aerobic conditions in the presence of adenine or adenosine and at least one member selected from the group consisting of citric acid, acetic acid, formic acid, succinic acid, fumaric acid, phthalic acid, tartaric acid and sodium salts of said acids, xylene, toluene, benzene, methanol, ethanol, ethyl acetate, methyl ethyl ketone, dioxane, isopropanol, isoamyl alcohol, 8-chloroxanthine, 2-thioadenine and 2-thio-6-hydroxypurine and accumulating adenosine 5'-triphosphate in the resultant culture liquor.

8. The process of claim 7, wherein said microorganism is selected from the group consisting of Brevibacterium ammoniagenes ATCC 6871 and Brevibacterium ammoniagenes ATCC 6872.

9. The process of claim 8, wherein culturing is carried out at a temperature of about 20° to 40° C. and at a pH of about 5.5 to 9.0.

10. A process for producing guanosine 5'-triphosphate which comprises culturing the microorganism Brevibacterium ammoniagenes in an aqueous nutrient medium containing a source of carbon and nitrogen under aerobic conditions in the presence of guanine or guanosine and at least one member selected from the group consisting of citric acid, acetic acid, formic acid, succinic acid, fumaric acid, phthalic acid, tartaric acid and sodium salts of said acids, xylene, toluene, benzene, methanol, ethanol, ethyl acetate, methyl ethyl ketone, dioxane, isopropanol, isoamyl alcohol, 8-chloroxanthine, 2-thioadenine and 2-thio-6-hydroxypurine and accumulating guanosine 5′-triphosphate in the resultant culture liquor.

11. The process of claim 10, wherein said microorganism is selected from the group consisting of *Brevibacterium ammoniagenes* ATCC 6871 and *Brevibacterium ammoniagenes* ATCC 6872.

12. The process of claim 11, wherein culturing is carried out at a temperature of about 20° to 40° C. and at a pH of about 5.5 to 9.0.

References Cited
UNITED STATES PATENTS

| | | |
|---|---|---|
| 3,296,089 | 1/1967 | Nakayama et al. |
| 3,308,036 | 3/1967 | Nakayama et al. |
| 3,313,710 | 4/1967 | Kinoshita et al. |
| 3,359,177 | 12/1967 | Nara et al. |

ALVIN E. TANENHOLTZ, *Primary Examiner.*

U.S. Cl. X.R.

195—100